(12) United States Patent
Willke

(10) Patent No.: US 6,754,751 B1
(45) Date of Patent: Jun. 22, 2004

(54) METHOD AND APPARATUS FOR HANDLING ORDERED TRANSACTIONS

(75) Inventor: Theodore L. Willke, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 536 days.

(21) Appl. No.: 09/821,085

(22) Filed: Mar. 30, 2001

(51) Int. Cl.[7] ............................................. G06F 13/14
(52) U.S. Cl. ........................ 710/112; 710/53; 710/310
(58) Field of Search ................................. 710/310, 112, 710/53

(56) References Cited

U.S. PATENT DOCUMENTS 6,405,276 B1 * 6/2002 Chen et al. ................. 710/310
6,513,090 B1 * 1/2003 Jeddeloh ..................... 710/310
6,618,782 B1 * 9/2003 Gulick et al. ............... 710/305
2002/0103948 A1 * 8/2002 Owen et al. .................. 710/33

* cited by examiner

Primary Examiner—Glenn A. Auve
Assistant Examiner—Nimesh Patel
(74) Attorney, Agent, or Firm—Jeffrey B. Huter

(57) ABSTRACT

A computer network is provided for handling ordered transactions between a chipset and a memory controller. The chipset provides an interface with a first bus segment and a second bus segment. The chipset may include logic to attach a destination code to ordered transactions transmitted from the chipset. The memory controller may also include logic to parse the destination code from ordered transactions and apply a fence with respect to a first queue and a second queue of the memory controller.

23 Claims, 8 Drawing Sheets

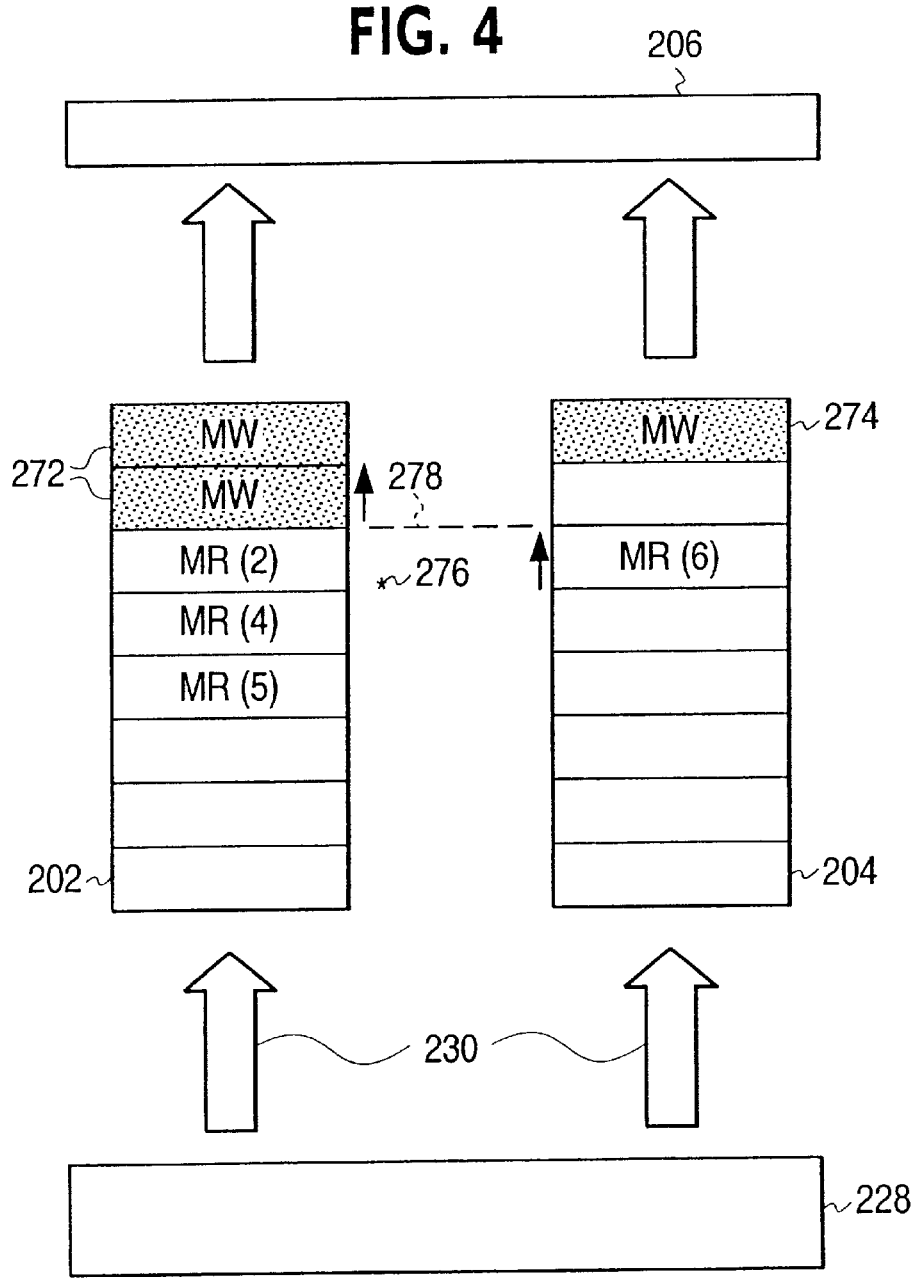

ID CODE

METHOD AND APPARATUS FOR HANDLING ORDERED TRANSACTIONS

FIELD

The present invention is related to data transactions. More particularly, the present invention is directed to managing memory controller hub transaction ordering in systems supporting bus communication.

BACKGROUND

Many programming tasks, especially those controlling intelligent peripheral devices common in Peripheral Component Interconnect (PCI) systems, require specific events to occur in a specific order. If the events generated by the program do not occur in the hardware in the order intended by the software, a peripheral device may behave in a totally unexpected way. PCI transaction ordering rules provide hardware the flexibility to optimize performance by rearranging certain events that do not affect device operation, yet strictly enforce the order of events that do affect device operation.

One performance optimization that PCI systems are allowed to do is the posting of memory write transactions. Posting means the transaction is captured by an intermediate agent; e.g., a bridge from one bus to another, so that the transaction is captured by an intermediate source before it actually completes at its intended destination. This allows the source to proceed with the next operation while the transaction is still making its way through the system to its ultimate destination.

While posting improves system performance, it complicates event ordering. Since the source of a write transaction proceeds before the write actually reaches its destination, other events that the programmer intended to happen after the write may happen before the write.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and that the invention is not limited thereto.

The following represents brief descriptions of the drawings in which like reference numerals represent like elements and wherein:

FIG. 3 illustrates the structure of a destination segment code according to an example embodiment of the present invention;

FIG. 4 illustrates two upstream command queues according to an example embodiment of the present invention;

DETAILED DESCRIPTION

Figure 1:
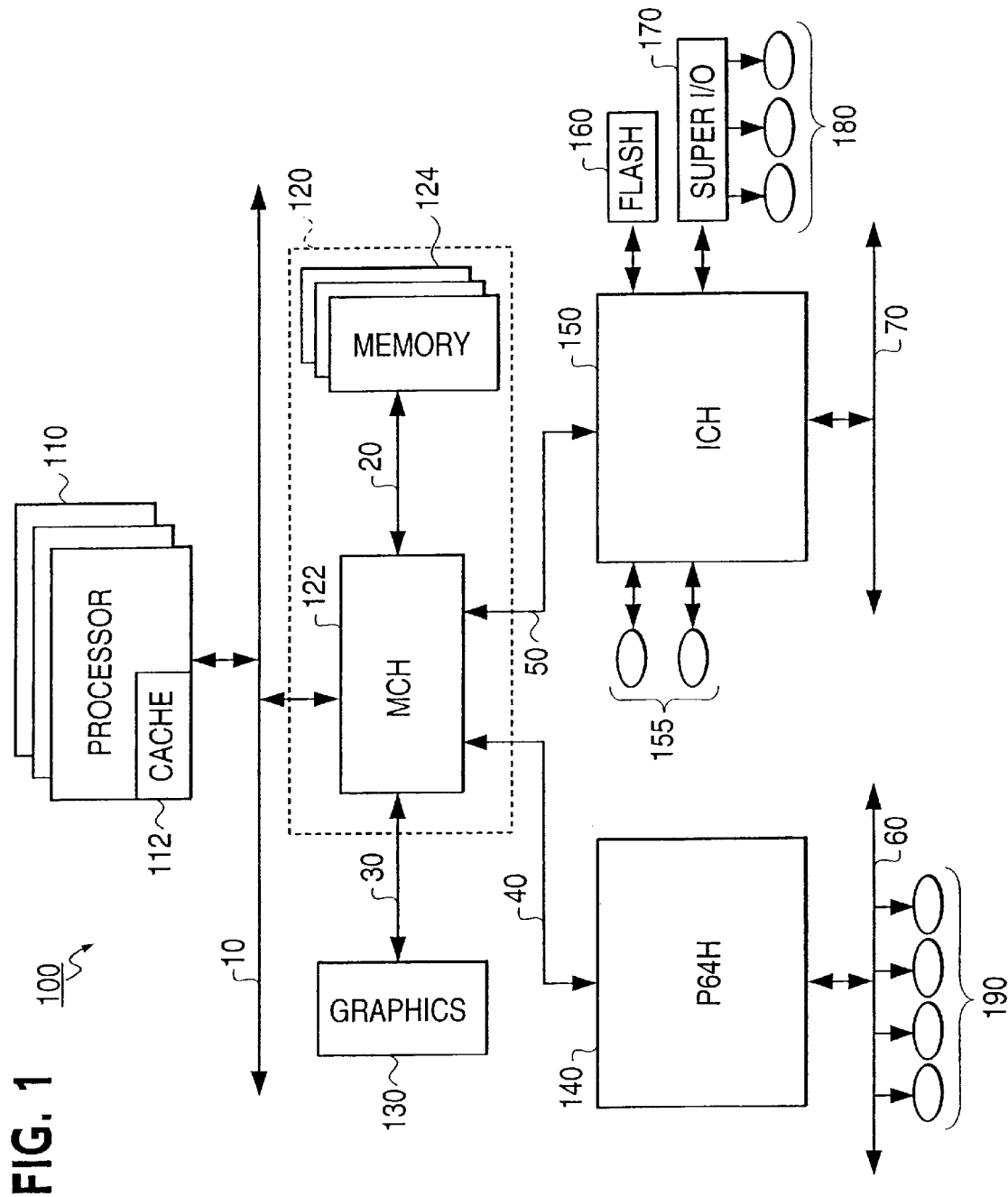
FIG. 1 is an example computer system platform.

Before beginning a detailed description of the subject invention, mention of the following is in order. When appropriate, like reference numerals and characters may be used to designate identical, corresponding or similar components in differing figure drawings. Further, in the detailed description to follow, example sizes/models/values/ranges may be given, although the present invention is not limited to the same. Further, arrangements may be shown in block diagram form in order to avoid obscuring the invention, and also in view of the fact that specifics with respect to implementation of such block diagram arrangements may be highly dependent upon the platform within which the present invention is to be implemented. That is, such specifics should be well within the purview of one skilled in the art. Where specific details (e.g., circuits, flowcharts) are set forth in order to describe example embodiments of the invention, it should be apparent to one skilled in the art that the invention can be practiced without, or with variation of, these specific details. Finally, it should be apparent that differing combinations of hard-wired circuitry and software instructions may be used to implement embodiments of the present invention. That is, the present invention is not limited to any specific combination of hardware and software.

Any reference in the specification to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

FIG. 1 shows an example computer system platform. As shown in FIG. 1, the computer system 100 may include a processor subsystem 110, a memory subsystem 120 coupled to the processor subsystem 110 by a front side bus 10, graphics 130 coupled to the memory subsystem 120 by a graphics bus 30, one or more host chipsets (labeled 140–150) coupled to the memory subsystem 120 by hub links 40 and 50 for providing an interface with peripheral buses such as Peripheral Component Interconnect (PCI) buses 60 and 70 of different bandwidths and operating speeds, a flash memory 160, and a super I/O 170 coupled to the chipset 150 by a low pin count (LPC) bus for providing an interface with a plurality of I/O devices 180 such as a keyboard controller for controlling operations of an alphanumeric keyboard, a cursor control device such as a mouse, track ball, touch pad, joystick, etc., a mass storage device such as magnetic tapes, hard disk drives (HDD), and floppy disk drives (FDD), and serial and parallel ports to printers, scanners, and display devices. A plurality of I/O devices 190 may be provided along the PCI bus 60. The computer system 100 may be configured differently or employ some or different components than those shown in FIG. 1.

The processor subsystem 110 may include a plurality of host processors and a cache subsystem 112. The memory subsystem 120 may include a memory controller hub (MCH) 122 coupled to the host processors by the front side bus 10 (i.e., host or processor bus) and at least one memory element 124 coupled to the MCH 122 by a memory bus 20. The memory element 124 may be a dynamic random-access-memory (DRAM), or may be a read-only-memory (ROM), video random-access-memory (VRAM) and the like. The memory element 124 stores information and instructions for use by the host processors. The graphics 130 may be coupled to the main controller hub 122 of the memory subsystem 120 by the graphics bus 30, and may include, for example, a graphics controller, a local memory and a display device (e.g., cathode ray tube, liquid crystal display, flat panel display, etc.).

The host chipsets (labeled 140 and 150) may be Peripheral Component Interconnect (PCI) bridges (e.g., host, PCI-PCI, or standard expansion bridges) in the form of PCI chips such as, for example, the PIIX4® chip and PIIX6® chip manufactured by Intel Corporation. In particular, the chipsets may correspond to a Peripheral Component Interconnect (PCI) 64-bit hub (P64H 140 or P64H2) and an input/output controller hub (ICH 150). The P64H 140 and the ICH 150 may be coupled to the MCH 122 of the memory subsystem 120 respectively by 16 bits and 8 bits hub links 40 and 50, for example, and may operate as an interface between the front side bus 10 and peripheral buses 60 and 70 such as PCI buses of different bandwidths and operating speeds. The PCI buses may be high performance 32 or 64 bit synchronous buses with automatic configurability and multiplexed address, control and data lines as described in the latest version of "PCI Local Bus Specification, Revision 2.2" set forth by the PCI Special Interest Group (SIG) on Dec. 18, 1998 for add-on arrangements (e.g., expansion cards) with new video, networking, or disk memory storage capabilities. For example, the PCI bus 60 of 64-bits and 66 MHz may connect to the P64H 140. Similarly, the PCI bus 70 of 32-bits and 33 MHz may connect to the ICH 150. Other types of bus architectures such as Industry Standard Architecture (ISA) and Expanded Industry Standard Architecture (EISA) buses may also be utilized.

The hub links 40 and 50 that couple the P64H 140 and the ICH 150 to the MCH 122 of the memory subsystem 120 may be primary PCI buses of different bandwidths and operating speeds. The peripheral buses 60 and 70 that connect the P64H 140 and the ICH 150 to I/O devices may be secondary PCI buses of different bandwidths and operating speeds. The P64H 140 and ICH 150 may correspond to PCI-PCI bridges designed for compliance with the "PCI Local Bus Specification, Revision 2.2" set forth by the PCI Special Interest Group (SIG) on Dec. 18, 1998, and the "PCI to PCI Bridge Architecture Specification, Revision 1.1" set forth by the PCI Special Interest Group (SIG) on Dec. 18, 1998.

Embodiments of the present invention relate to an efficient method of managing memory controller hub (MCH) transaction ordering in systems supporting peer-to-peer industry standard I/O bus communication. Such peer-to-peer traffic may be routed from one I/O bus through an expander bridge device (such as the P64H 140) and on to another I/O bus.

Embodiments of the present invention may also relate to a producer-consumer ordering model. The producer-consumer model for data movement between two devices (also called masters) is one example of a system that may use this type of ordering. In this model, one agent, the producer, may produce or create the data and another agent, the consumer, may consume or use the data. The producer and consumer may communicate between each other via a flag and a status element. The producer may set the flag when all the data has been written and then wait for a completion status code. The consumer may wait until it finds the flag set, then it resets the flag, consumes the data, and writes the completion status code. The producer-consumer model is discussed in more detail in Appendix E of the "PCI Local Bus Specification, Revision 2.2."

Producer-consumer ordering provides that a consumer does not see a semaphore set and read data prior to the data being written (and validated by the semaphore) into memory by the producer. High-performance server and workstation chipsets thereby make provisions to ensure that adequate ordering rules are enforced so that the producer-consumer model is not broken.

Figure 2:
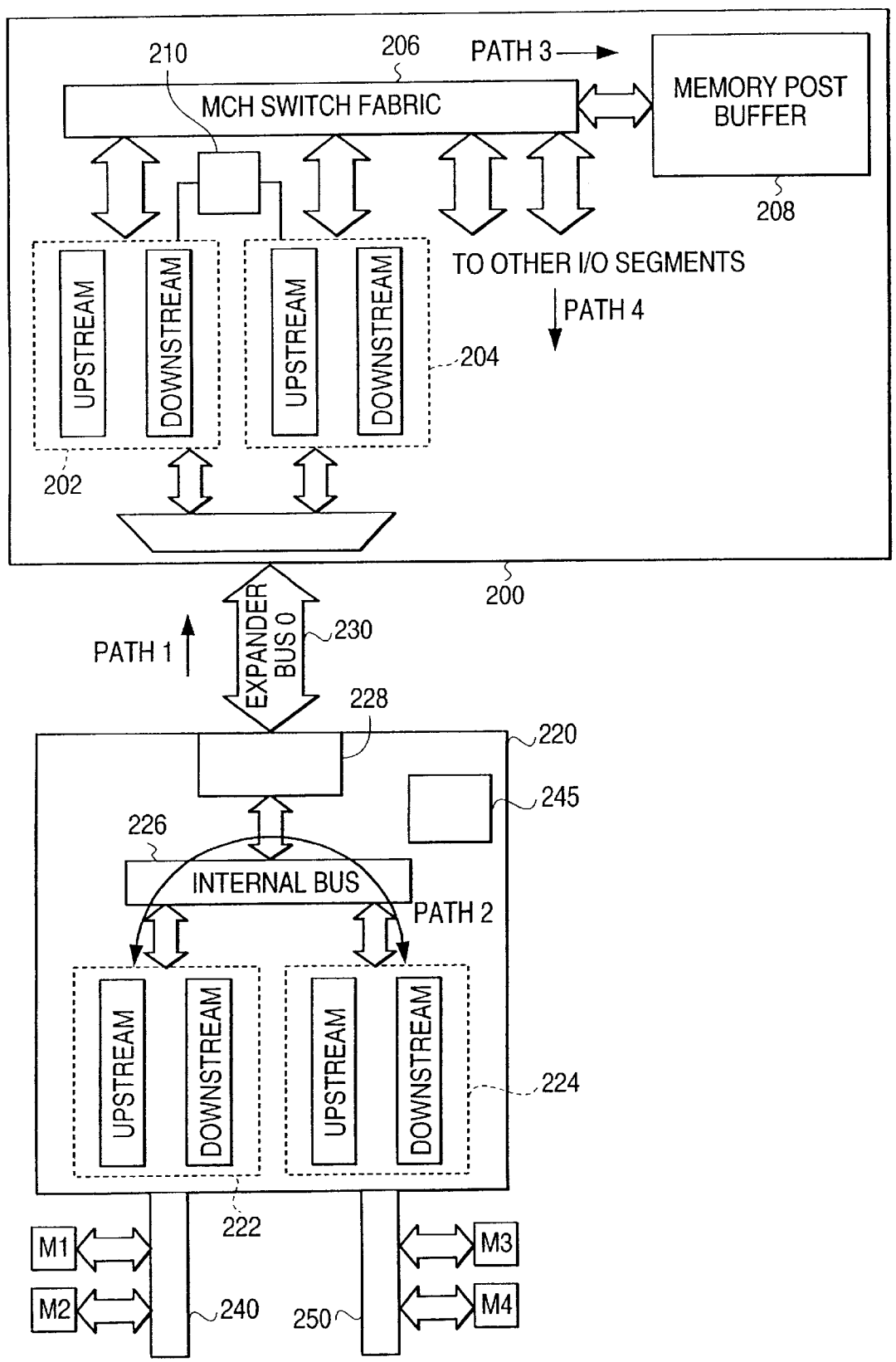
FIG. 2 illustrates an example chipset architecture.

FIG. 2 illustrates a chipset architecture that includes a memory controller hub and an expander bus in a similar manner as shown in FIG. 1. In particular, a memory controller hub (MCH) 200 may be coupled to a PCI expander bridge 220 by an expander bus 230. The MCH 200 may correspond to the MCH 122, the PCI expander bridge 220 may correspond to the P64H 140 and the expander bus 230 may correspond to the bus (or hub link) 40. The MCH 200 may include an A-side command request queue 202 (hereafter also called an A queue) and a B-side command request queue 204 (hereafter also called a B queue) that receives data from upstream and downstream sources. The queues 202 and 204 may be coupled to a MCH switch fabric 206 to provide communication among each of the queues 202 and 204, I/O segments and a memory post buffer 208. Although not shown, the memory post buffer 208 may be coupled to a memory interface which in turn may be coupled to a main memory (such as the memory element 124 of FIG. 1). Operations, methodologies and algorithms of the queues 202 and 204 may be controlled by an arbiter device 210. The arbiter device 210 may control operations of any component associated with the switch fabric 206.

The PCI expander bridge 220 may include an expander bus interface 228 to couple to the expander bus 230, an internal bus 226, an A-side command request queue 222, a B-side command request queue 224, and an arbiter device 245. Each of the queues 222 and 224 may include channels for upstream data and downstream data. The queues 222 and 224 may be further coupled to an A-side PCI bus segment 240 and a B-side PCI bus segment 250. Each of these bus segments 240 and 250 may separately correspond to the bus 60 (FIG. 1) or a similar type of device. Devices M1 and M2 may be coupled to the bus segment 240 and devices M3 and M4 may be coupled to the bus segment 250. Operations, methodologies and algorithms of the bridge 220 (and the queues 222 and 224) may be controlled and/or operated by the arbiter device 245. The arbiter device 245 may control operations of any component associated with the internal bus 226.

FIG. 2 will now be used to illustrate a method to perform transaction routing in a MCH device. As is known, processors, main memory and I/O sub-systems may use the switch fabric 206 to convey transactions. Chipsets may support two PCI/PCI-X buses per MCH expander port (via the expander bridge 220). However, PCI ordering rules generally do not enforce ordering between inbound traffic initiated by the bus segments 240 and 250. Therefore, the MCH 200 may implement separate upstream (and downstream) transaction queues 202 and 204 for each segment's traffic to thereby reducing potential "head-of-line" blocking in the MCH's input buffered switch configuration. All request traffic received by the expander bridge 220 may therefore be tagged with a source (segment) identification (ID) to determine into which upstream command request queue (e.g. A-side or B-side) to place a received request. The architecture may include a mechanism to enforce ordering across both upstream queues (e.g. A-side and B-side) under certain circumstances in order to uphold the ordering required by the producer-consumer model.

An example will now be discussed in which device M1 is the data producer and device M3 is the data consumer. This example and others will be described with respect to path 1, path 2, path 3 and path 4 that are all shown in FIG. 2. Device M1 may send upstream write data to the system main memory via the A-side PCI segment 240 and the A-side command request queues 222 and 202 (path 1). The data may be ordered with respect to the other system traffic destined to the main memory once it reaches the memory post buffer 208 (path 3). Device M1 may then send a parallel-segment-peer (PSP) write to the device M3 via path 2. This PSP write communicates the availability of device M1's upstream write data in the main memory. Device M3 may then send an upstream read request via the B-side PCI bus segment 250 and the B-side command request queues 224 and 204 (path 1) to the memory interface. If the device M1's write is not guaranteed to complete prior to the device M3's read, then the device M3 may not receive the intended data. This may happen if the device M3's read request, which transcends the MCH's upstream B-side command request queue 204, does not "push" the device M1 write request, which transcends the MCH's upstream A-side command request queue 202. This example highlights a ordering requirement between upstream command queues under certain conditions (i.e., when upstream requests are related by parallel-segment semaphore passing). The same scenario between two devices communicating in a producer-consumer manner over path 4 may not be subject to the potential ordering pitfall. That is, the producer's upstream semaphore write request may push the producer's upstream write request data transfer onto path 3 prior to reaching the consumer.

In order to mitigate these and other problems, the expander bridge 220 may immediately issue a "fence" transaction over path 1 each time a parallel-segment-peer (PSP) transaction is observed on path 2. The "fence" may temporarily force strong ordering across the MCH's A-side command request queue 202 and the B-side command request queue 204. More specifically, the fence may force all preceding write commands (in the upstream direction) to initiate on path 3 before any subsequent command received from the same expander interface 228 reaches the MCH switch fabric 206. However, this technique may be disadvantageous in that it may use up expander bus bandwidth (each time the dataless "fence" transaction is issued) and enforce over-restrictive (sub-optimal) ordering. The ordering may be over-restrictive in the sense that transactions following the "fence" transaction and destined for the upstream A-side command request queue 202 may not pass writes in the B-side command request queue 204 and those bound for the upstream B-side command request queue 204 may not pass writes in the A-side command request queue 202. In this example, the device M1 is the producer and the device M3 is the consumer and (following the semaphore issue on path 2) traffic arriving for the MCH's upstream A-side command request queue 202 may still freely pass the occupants of the B-side command request queue 204, but not vice-versa. The producer-consumer model does not require that commands arriving from the expander interface 228 for the A-side command request queue 202 wait for writes to flush from the B-side command request queue 204 prior to issuing on path 3.

Embodiments of the present invention may include a two-bit code or field added to the header of existing expander bus transactions to address these and other issues. FIG. 3 illustrates a destination segment code (DSC) 260 having a first bit 261 and a second bit 262. Each of the bits may be either a "0" or "1". The first bit 261 may correspond to the A-side bus segment 240 and the second bit 262 may correspond to the B-side bus segment 250. That is, the first bit 261 may be "1" if a device on the A-side bus segment 240 is the destination and the second bit 262 may be "1" if a device on the B-side bus segment 250 is the destination. The DSC code 260 may be applied to all expander transaction headers (for transactions involved in memory read or write data transfers). In the following discussion, the segment numbers may relate to mapping to Queue A or Queue B.

FIG. 4 illustrates two upstream command request queues servicing a single expander port of the MCH 200. More specifically, FIG. 4 shows the upstream A-side command request queue 202 and the upstream B-side command request queue 204. The queues 202 and 204 may be first-in-first-out (FIFO) type of queues (or buffers) that receive memory read (MR) and memory write (MW) transactions from the expander bus interface 228 and forward the transactions to the switch fabric 206 based on operation of the arbiter device 210.

The sequence of transactions for the FIG. 4 example is as follows: (1) initial state; (2) MR A-to-memory; (3) peer to peer (PSP) write A-to-B; (4) MW Ato-memory; (5) MW A-to-memory; and (6) MR B-to-memory. In this example, the MW transactions (labeled 272 and 274) are already present in the queues. The transactions that arrive at the queues 202 and 204 from the expander bus interface 228 include a DSC code. The code 260 may indicate whether: (1) neither segment must fence the other (default) (i.e., a "00" code), (2) segment A fences segment B (i.e., a "01" code), (3) segment B fences segment A (i.e., a "10" code), or (4) both segment A and segment B fence each other (i.e., a "11" code). Other combinations of the codes with respect to their meaning are also within the scope of the present invention. Segment A fences segment B means that writes must clear the A-side command request queue 202 prior to new read or write request arrivals (after the fence is signaled) issuing from the B-side command request queue 204. On the other hand, segment B fences segment A means that writes must clear the B-side command request queue 204 prior to any new expander read or write request arrivals (after the fence is signaled) issuing from the A-side command request queue 202.

With reference to FIG. 4, the device M1 on the A-side PCI bus segment 240 is the producer and the device M3 on the B-side PCI bus segment 250 is the consumer. The device M1 sends in MW data (transaction 1) and continues with a MR (transaction 2). Transaction 3 (PSP write A-to-B) is the semaphore (passed along path 2) indicating that the MW data is ready for the consumer (i.e., the device M3). Embodiments of the present invention may attach a DSC code to the next transaction (i.e., transaction 4) after the semaphore is passed. The DSC code may indicate who is getting the data or who is the destination receiver. In this example, transaction 4 includes data having the DSC code 260, to indicate that transaction 6 in the B-side command request queue 204 may issue only after the MW's labeled 272 in the A-side command request queue 202 issue. In other words, the DSC code causes a fence (shown by a dotted line 278) to issue that prevents subsequent actions (i.e., MW and MR) of the B-side command request queue 204 from proceeding to the switch fabric 206 until the actions before the fence in the A-side command request queue 202 (i.e., MW labeled 272) have been completed. Transaction 6 is the consumer's response to the semaphore (from transaction 3). In accordance with embodiments of the present invention, transaction 6 does not pass the MW's labeled 272 in the A-side command request queue 202.

The expander bridge 220 includes a mechanism (such as the arbiter device 245) to insert a "segment A fences segment B" code (i.e., a "01" code) into the DSC field of the next expander bus transaction following transaction 3. This is transaction 4 and is denoted by an asterisk 276. The dotted line 278 represents a fence that maintains transaction 6 ordered with respect to the MW's (labeled 272) in the A-side command request queue 202. Once the MW's labeled 272 have issued, the fence may evaporate and both the queues 202 and 204 may operate independently. This is an example of the DSC code 260 conveying a fence for the B-side command request queue 204 via a transaction destined for the A-side command request queue 202. Transactions other than transaction 4 may carry the DSC default code (i.e., a "00" code).

Figure 5:
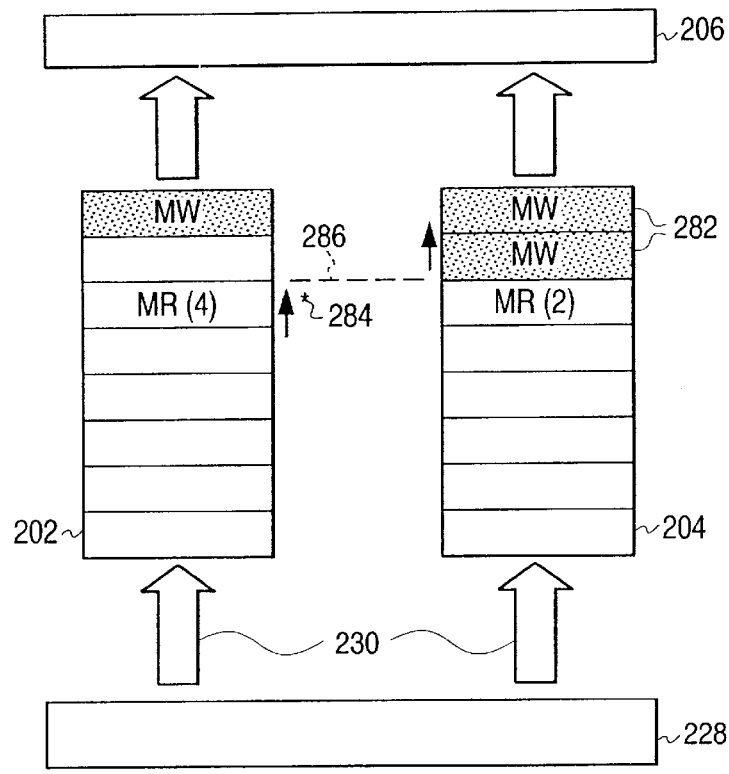
FIG. 5 illustrates two upstream command queues according to an example embodiment of the present invention.

FIG. 5 illustrates how the DSC code 260 may enforce ordering for a transaction arriving and simultaneously announcing the need to have itself fenced. In this example, the B-side bus segment 250 houses the producer and the A-side bus segment 240 houses the consumer. The sequence of transactions for the FIG. 5 example is as follows: (1) initial state; (2) MR B-to-memory; (3) PSP write B-to-A; and (4) MR A-to-memory. In this example, transaction 3 includes the semaphore (path 2) and thus transaction 4 (i.e., the next transaction in the other queue) includes the DSC code indicating that that transaction may issue from the A-side command request queue 202 only after the MW's labeled 282 in the B-side command request queue 204 issue. More specifically, transaction 4 arrives and must be ordered with respect to the MW's labeled 282 that were transmitted to the MCH 200 prior to transaction 3. Transaction 4 includes the DSC code 260 for "segment B fences segment A" (i.e., a "10" code) to accomplish the proper ordering. This may be seen in FIG. 5 as an asterisk 284. The fence may be represented by a dotted line 286.

Figure 6:
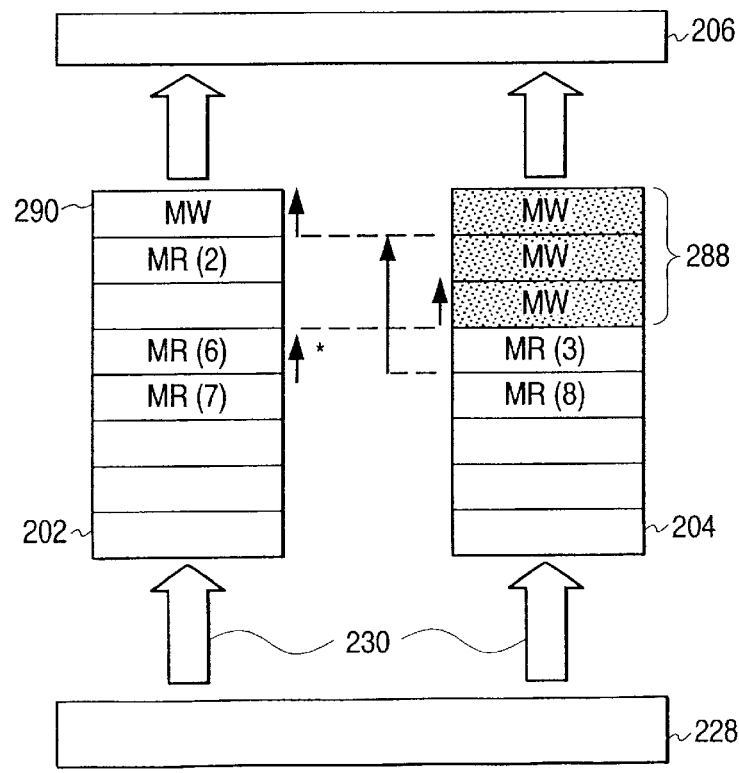
FIG. 6 illustrates two upstream command queues according to an example embodiment of the present invention.

FIG. 6 illustrates dual-dependency fencing according to an example embodiment of the present invention. FIG. 6 is a schematic representation of two upstream command queues servicing a single expander bus interface. The sequence of transactions for the FIG. 6 example are as follows: (1) initial state; (2) MR A-to-memory; (3) MR B-to-memory; (4) PSP write A-to-B; (5) PSP write B-to-A; (6) MR A-to-memory; (7) MW A-to-memory; and (8) MR B-to-memory. While these transactions include PSP write B-to-A, one skilled in the art from reading this description would understand that a PSP read A-to-B could be similarly substituted. In this example, both the A-side bus segment 240 and the B-side bus segment 250 issue semaphores to each other by transactions 4 and 5. Since both bus segments may house consumers, the transaction transmitted over the expander bus interface 228 following both PSP writes carries a DSC code indicating that the A-side bus segment 240 and the B-side bus segment 250 fence each other. More specifically, transaction 6 conveys a DSC field code indicating: (1) that transactions may issue from the A-side command request queue 202 only after the MW's labeled 288 in the B-side command request queue 204 issue; and (2) that subsequent transactions in the B-side command request queue 204 (such as subsequent transaction 8) must be ordered with respect to the previous tail write (i.e., the MW labeled 290 in the A-side command request queue 202). In this embodiment, subsequent is intended to mean subsequent in-time. As shown, strict ordering may be enforced beginning with transaction 6 and transaction 8. When the initial MW's have issued, the queues may revert to independent operation.

Figure 7:
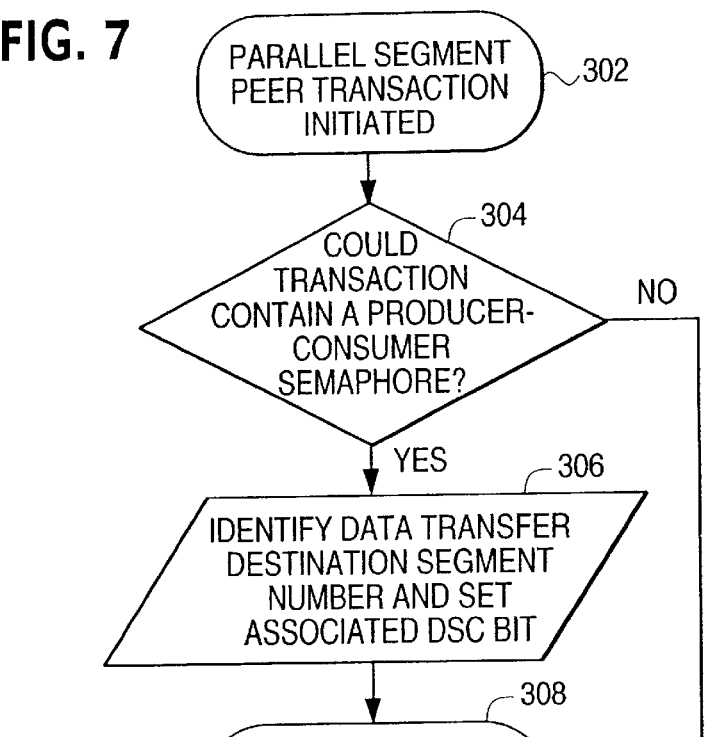
FIG. 7 is a flowchart of a methodology performed within an expander bridge according to an example embodiment of the present invention.
Figure 8:
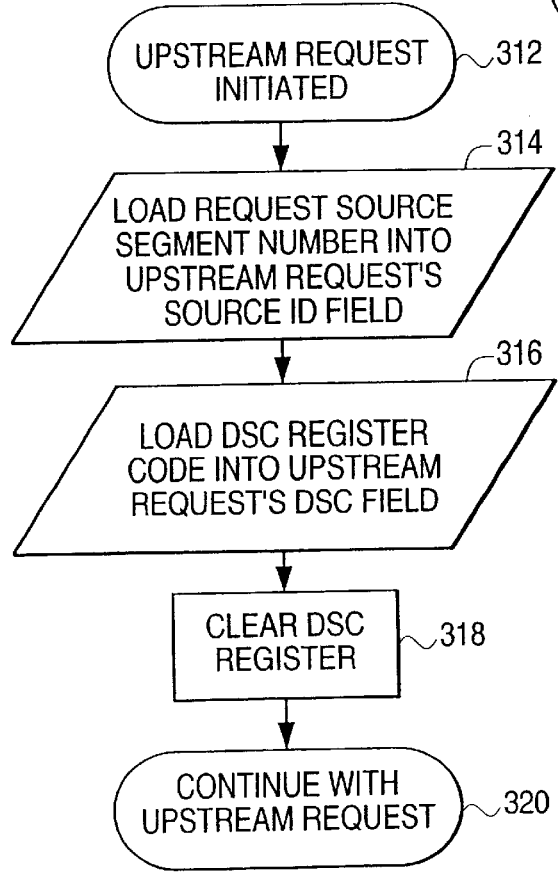
FIG. 8 is a flowchart of a methodology performed within an expander bridge according to an example embodiment of the present invention.
Figure 9:
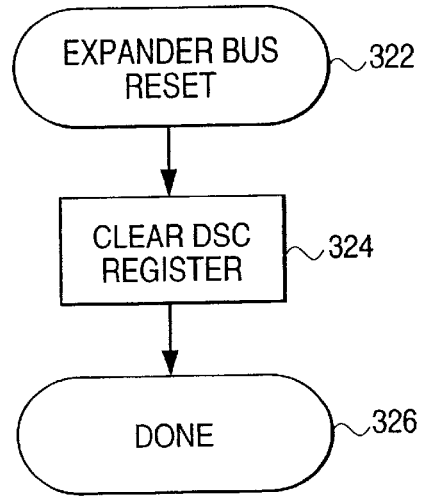
FIG. 9 is a flowchart of a methodology performed within an expander bridge according to an example embodiment of the present invention.
Figure 12:
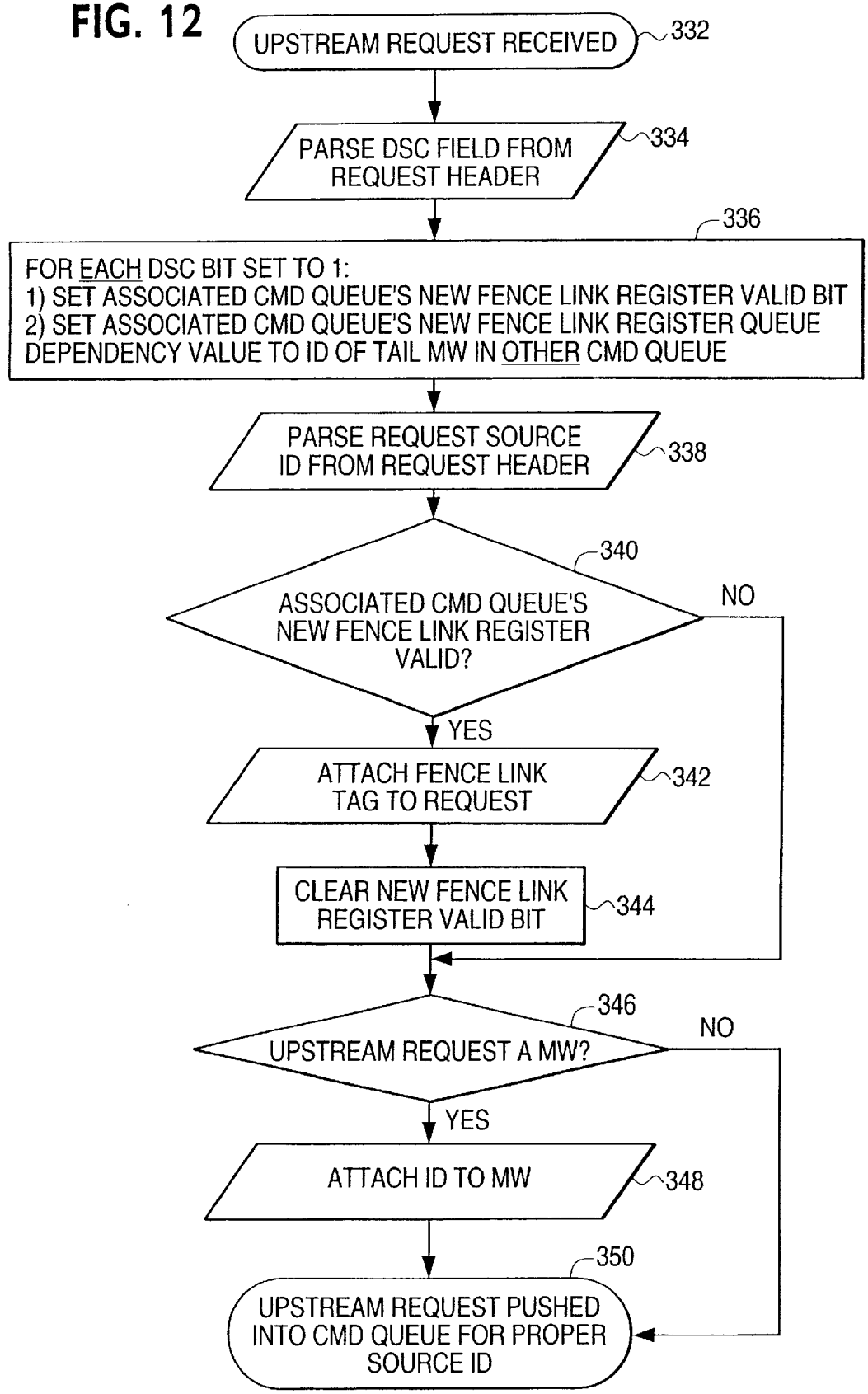
FIG. 12 is a flowchart of a methodology performed within a memory controller according to an example embodiment of the present invention.
Figure 13:
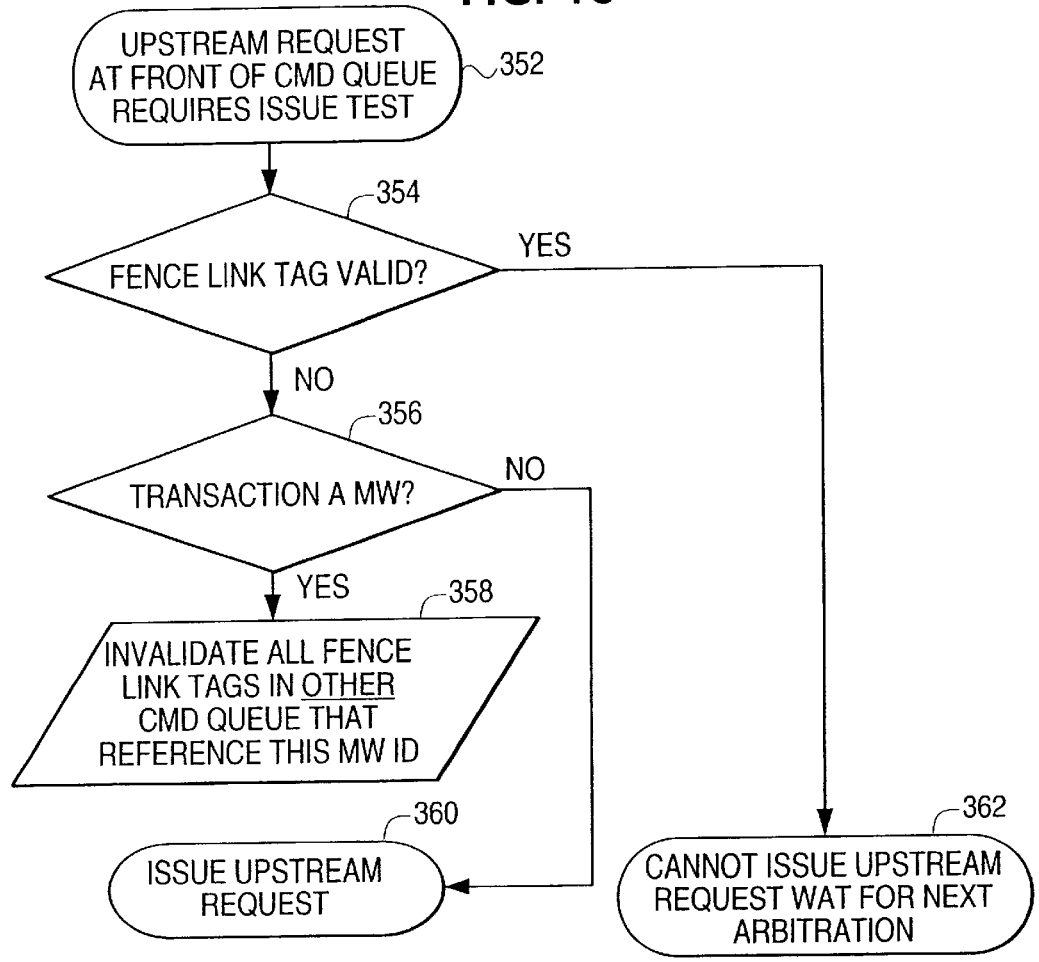
FIG. 13 is a flowchart of a methodology performed within a memory controller according to an example embodiment of the present invention.
Figure 14:
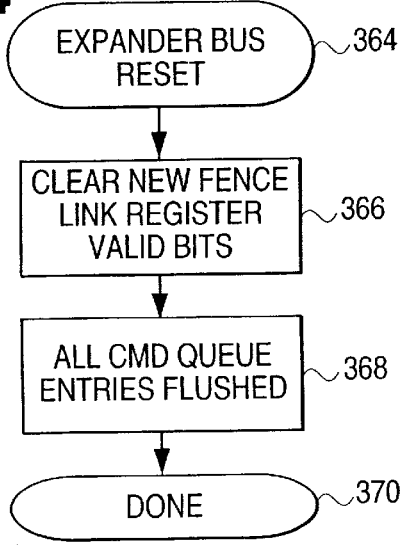
FIG. 14 is a flowchart of a methodology performed within a memory controller according to an example embodiment of the present invention.

Embodiments of the present invention provide logic in the expander bridge 220 and the MCH 200 to provide the various methodologies described above and below. These methodologies may be represented by flow charts. FIGS. 7–9 are flow charts providing the logic behavior of the expander bridge 220 and FIGS. 12–14 are flow charts providing the logic behavior of the MCH 200. These flow charts will now be discussed specifying methodologies, state machines and/or logic to uphold an ordering methodology within the MCH 200 or the expander bridge 220. Other flow charts, methodologies and embodiments are also within the scope of the present invention.

As shown in the flow chart of FIG. 7, in block 302, a parallel segment peer (PSP) transaction is initiated. In block 304 a determination is made whether the transaction contains a producer-consumer semaphore. If affirmative, then a data transfer destination segment code (DSC) may be identified and the associated DSC bit may be set in block 306. In block 308, the algorithm continues with parallel segment peer transactions. On the other hand, if a negative determination is made in block 304, then the methodology proceeds to block 308 to continue with parallel segment peer transactions. Stated differently, each time a PSP transaction transpires and is of a type that may carry a semaphore, the target segment receiving the semaphore may be reflected by asserting the appropriate bit in the DSC register element. This bit assertion may be a logical OR operation with the contents of the current DSC register element.

As shown in the flow chart of FIG. 8, in block 312, an upstream request may be initiated in block 312. The request source segment number may be loaded into the upstream request source ID transaction header field in block 314. In block 316, the DSC register code may be loaded into the upstream request's DSC transaction header field. The DSC register may be cleared in block 318 and the methodology may continue with the upstream requests in block 320. As shown in the flow chart of FIG. 9, the expander bus may be reset in block 322 and the DSC register may be cleared in block 324. The methodology may end in block 326. Stated differently, a upstream request may be initiated by either segment. The segment ID may be loaded into the transaction header so that the transaction may be steered by the MCH logic into the proper command queue. The contents of the current DSC register may be loaded into the packet's DSC field. The expander bus DSC register may then be cleared (to "00") and the upstream request may be issued over the expander bus.

Figure 10:
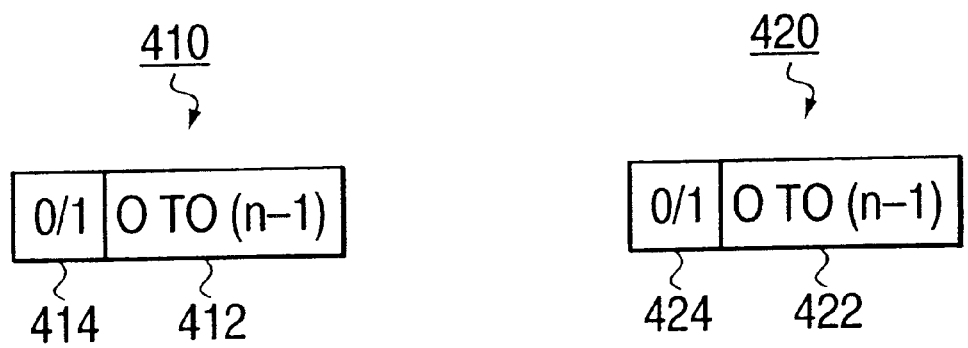
FIG. 10 illustrates fence link registers and fence link tag data structures according to an example embodiment of the present invention.
Figure 11:
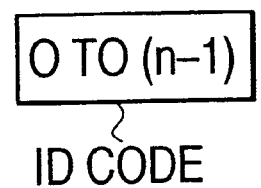
FIG. 11 illustrates a memory write ID data structure according to an example embodiment of the present invention.

FIG. 10 illustrates a fence link register/fence link tag data structure. The MCH 200 may implement the fence link structure for each of the two command queues 202 and 204 and the fence link structure for each queue entry. These data structures convey the fence(s) to the logic of the MCH 200. As shown, element 410 represents the fence link tag for the A-side command request queue 202 and the element 420 represents the fence link tag for the B-side command request queue 204. The fence link tag 410 includes a first field 412 for the B-side queue dependency and a second field 414 for the fence link valid bit. Similarly, the fence link tag 420 includes a first field 422 for the A-side queue dependency and a second field 424 for the fence link valid bit. FIG. 11 shows a memory write ID data structure 430 that includes a field for an ID code of 0 to (n−1).

FIG. 12 is a flow chart showing the action taken each time a new transaction is received from the expander bus interface 228. In block 332, an upstream request is received. The DSC field or code may be parsed from the request header in block 334. In block 336, for each DSC bit set to 1, the methodology may perform the following: 1) set the associated command queue's fence link register valid bit; and 2) set the associated command queue's fence link register queue dependency value to the tail MW in the other command queue. The request source ID may be parsed from the request header in block 338. A determination may be made in block 340 whether the associated command queue's fence link register is valid. If valid, then the fence link tag may be attached to the request in block 342. On the other hand, if a negative determination is made in block 340, then the algorithm proceeds to block 346. In block 344, the fence link register valid bit may be cleared. In block 346, a determination is made whether an upstream request is a MW. If so, then an ID may be attached to the MW in block 348. If not, then the algorithm may proceed to block 350. In block 350, an upstream request may be pushed into the command queue for the proper source ID.

Stated differently, the flow chart of FIG. 12 shows that the DSC field may be first parsed from the command header and a fence link register update may be performed for either queue if the queue's associated DSC bit is set. The update may include setting a valid bit and indicating the transaction dependency. The dependency may be encoded using MW ID's that are tagged to every memory write command received into either queue. As an example, if a request is received with a DSC code of "01," the A-side command request queue 202 fence link register may have its fence link valid bit set and the ID code for the tail MW (at that instant) in the B-side command request queue 204 may be encoded as the dependency. The transaction header may subsequently have its request source ID field parsed to determine its destination queue. If the target queue's fence link register is valid (e.g. if the example transaction is destined for the A-side command request queue 202), then the valid fence link tag may be attached to the transaction and the fence link register's valid bit may be cleared. If the transaction is an upstream write, it will receive a MW ID so that any future dependencies on it may be described (if necessary).

FIG. 13 is a flow chart that shows the process occurring each time a transaction reaches the front of either command queue. In block 352, the upstream request at the front of the command queue requires an issue test. In block 354, a determination is made whether the fence link tag is valid. If affirmative, then another determination is made in block 356 regarding whether the transaction is a MW. On the other hand, if a negative determination is made in block 354 then the methodology proceeds to block 362 in which it can not issue an upstream request and waits for the next arbitration. If an affirmative determination is made in block 356, then all fence link tags in other command queues that reference this MW ID may be invalidated. In block 360, the upstream request may be issued. If a negative determination is made in block 356, then the methodology proceeds to block 360. Stated differently, if the fence link tag is not valid (or no longer valid), the transaction will issue following an update to the tags of all transactions in the adjacent queue that may depend on it. If the fence link tag is valid, the transaction may not issue and will wait until the tag is invalidated.

FIG. 14 is a flow chart that shows that all data structures associated with the command queues are cleared if the related expander bus interface 228 is reset. The expander bus 228 may be reset in block 364. The fence link register valid bits may be cleared in block 366 and all command queue entries may be flushed in block 368. The algorithm may then end in block 370.

The above embodiments have been described with respect to methodologies that may be performed within the MCH 200 and the expander bridge 220. For example, the MCH 200 may include logic in the form of a processing device such as the arbiter device 210 to operate and control the methodologies. The expander bridge 220 may also include logic in the form of a processing device such as the arbiter device 245 to operate and control the methodologies. The methodologies may be provided within software (or software routines) provided within the arbiter devices 210 and 245. The mechanisms and/or routines may also be provided on a program storage device (such as a disk for example) that is readable by a machine (such as a computer system) and include a program of instructions that are executable by the machine to perform the methodology and/or routine.

Further, in the above description, a fence has been provided between a previous write and a more recent read. Embodiments of the present invention are also applicable to other transactions.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A computer network comprising:

a memory controller; and a chipset to couple to said memory controller to provide an interface with a first bus segment and a second bus segment, said chipset including logic to attach a destination code to ordered transactions to be transmitted to said memory controller, wherein said memory controller includes a first queue to store ordered transactions from said first bus segment and a second queue to store ordered transactions from said second bus segment, and wherein said destination code corresponds to a fence with respect to said first queue and said second queue.

2. The computer network of claim 1, wherein said fence represents one of: (1) said first bus segment fences said second bus segment, (2) said second bus segment fences said first bus segment, (3) neither bus segment fences the other bus segment, and (4) both said first bus segment and said second bus segment fence each other.

3. A computer network comprising:

a memory controller; and a chipset to couple to said memory controller to provide an interface with a first bus segment and a second bus segment, said chipset including logic to attach a destination code to ordered transactions to be transmitted to said memory controller, wherein said memory controller includes a first queue to store ordered transactions from said first bus segment and a second queue to store ordered transactions from said second bus segment, and wherein said first queue is associated with a first fence link register and said second queue is associated with a second fence link register, said first fence link register including a first field to indicate a dependency from said second queue and a second field to represent a fence link valid bit, said second fence link register including a third field to indicate a dependency from said first queue and a fourth field to represent a fence link valid bit.

4. A computer network comprising:

a memory controller; and a chipset to couple to said memory controller to provide an interface with a first bus segment and a second bus segment, said memory controller including logic to determine a destination code attached to ordered transactions received from said chipset, wherein said memory controller further includes a first queue to store ordered transactions from said first bus segment and a second queue to store ordered transactions from said second bus segment, and wherein said destination code corresponds to a fence with respect to said first queue and said second queue.

5. The computer network of claim 4, wherein said fence represents one of: (1) said first bus segment fences said second bus segment, (2) said second bus segment fences said first bus segment, (3) neither bus segment fences the other bus segment, and (4) both said first bus segment and said second bus segment fence each other.

6. A computer network comprising:

a memory controller; and a chipset to couple to said memory controller to provide an interface with a first bus segment and a second bus segment, said memory controller including logic to determine a destination code attached to ordered transactions received from said chipset, wherein said memory controller further includes a first queue to store ordered transactions from said first bus segment and a second queue to store ordered transactions from said second bus segment, and wherein said first queue is associated with a first fence link register and said second queue is associated with a second fence link register, said first fence link register including a first field to indicate a dependency from said second queue and a second field to represent a fence link valid bit, said second fence link register including a third field to indicate a dependency from said first queue and a fourth field to represent a fence link valid bit.

7. A method of handling ordered transactions in a computer network, said method comprising:

attaching a destination code to an ordered transaction;

transmitting said destination code and said ordered transaction to a memory controller;

storing ordered transactions from a first bus segment in a first queue of said memory controller and storing ordered transactions from a second bus segment in a second queue of said memory controller; and applying a fence with respect to said first queue and said second queue based on said destination code.

8. The method of claim 7, wherein said fence represents one of: (1) said first bus segment fences said second bus segment, (2) said second bus segment fences said first bus segment, (3) neither bus segment fences the other bus segment, and (4) both said first bus segment and said second bus segment fence each other.

9. A method of handling ordered transactions in a computer network, said method comprising:

attaching a destination code to an ordered transaction;

transmitting said destination code and said ordered transaction to a memory controller; and storing ordered transactions from a first bus segment in a first queue of said memory controller and storing ordered transactions from a second bus segment in a second queue of said memory controller, wherein said destination code corresponds to a fence with respect to said first queue and said second queue.

10. The method of claim 9, further comprising, maintaining an order of said ordered transactions based on said fence.

11. A program storage device readable by machine, tangibly embodying a program of instructions executable by the machine to perform a method of handling ordered transactions in a computer network, said method comprising:

attaching a destination code to an ordered transaction;

transmitting said destination code and said ordered transaction to a memory controller;

storing ordered transactions from a first bus segment in a first queue of said memory controller and storing ordered transactions from a second bus segment in a second queue of said memory controller; and applying a fence with respect to said first queue and said second queue based on said destination code.

12. An apparatus comprising a plurality of queues to receive and store ordered transactions and to define fences between queues of the plurality of queues based upon destination codes of the received transactions, and an arbiter to select transactions from the plurality of queues in an order that honors any defined fences of the plurality of queues.

13. The apparatus of claim 12 wherein the plurality of queues define a fence by tagging a transaction with a fence link tag comprising a valid field that indicates the fence link tag is valid and an identifier field that identifies a write transaction of the plurality of queues to process prior to the tagged transaction.

14. The apparatus of claim 13 wherein the arbiter selects a write transaction from the plurality of queues and invalidates the valid field of each fence link tag that has an identifier field that identifies the selected write transaction.

15. The apparatus of claim 14 wherein the arbiter selects a transaction from the plurality of queues only if the transaction has a valid field that indicates its fence link tag is invalid.

16. The apparatus of claim 12 wherein each queue of the plurality of queues has an associated fence link register that comprises a valid field to indicate whether the fence link register is valid and an identifier field to indicate a transaction of another queue of the plurality of queues to process prior to any transaction added to the queue while the valid field indicates that the fence link register associated with the queue is valid.

17. The apparatus of claim 16 wherein a queue of the plurality of queues, in response to storing a transaction while the valid field indicates the associated fence link register is valid, defines a fence by tagging the transaction with a fence link tag comprising a valid field that indicates the fence link tag is valid and an identifier field that identifies the transaction identified by the identifier field of the associated fence link register.

18. The apparatus of claim 16 wherein the valid field of the fence link register is updated based upon the destination code indicating whether the queue associated with the fence link register is to be fenced.

19. An apparatus comprising a first queue to send requests to a first bus segment and to receive requests from the first bus segment, a second queue to send requests to a second bus segment and to receive requests from the second bus segment, an internal bus to transfer semaphore transactions between the first queue and the second queue, and an arbiter to select transactions of the first queue and the second queue for issuance on a bus, and in response to a semaphore transaction between the first queue and the second queue, to associate with a transaction a destination code that indicates a fence between transactions of the first queue and the second queue.

20. The apparatus of claim 19 wherein the destination code comprises a bit for the first queue and a bit for the second queue, and the arbiter updates the bit for the first queue to indicate whether transactions of the first queue are fenced and updates the bit for the second queue to indicate whether transactions of the second queue are fenced.

21. The apparatus of claim 20 wherein the destination code further comprises a source identifier that indicates which bus segment the associated transaction originated.

22. The apparatus of claim 19 wherein the arbiter updates the destination code to indicate a transaction of the second queue is fenced by a transaction of the first queue in response to a semaphore write transaction from the first queue to the second queue.

23. The apparatus of claim 19 wherein the arbiter updates the destination code to indicate a transaction of the second queue is fenced by a transaction of the first queue in response to a semaphore read transaction from the second queue to the first queue.

* * * * *